Feb. 20, 1923.
E. C. BLACKWELL.
TRANSMISSION GEAR.
FILED AUG. 27, 1919.
1,445,741.
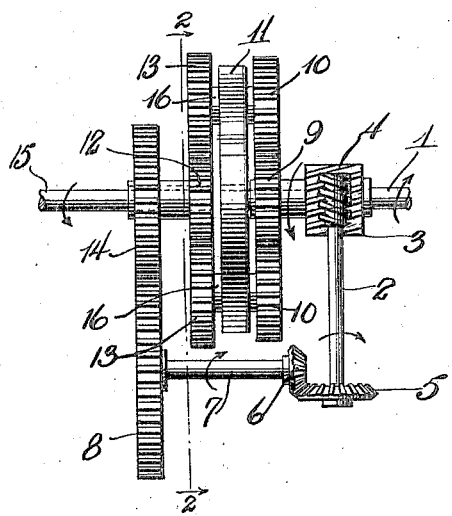
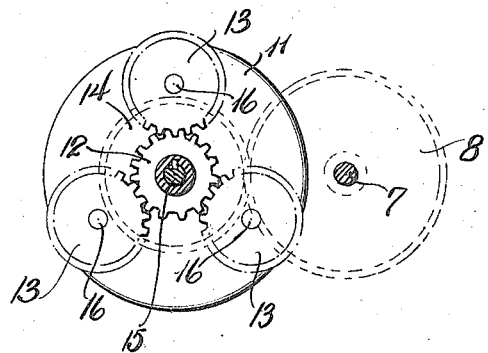

Patented Feb. 20, 1923.

1,445,741

UNITED STATES PATENT OFFICE.

ELMER C. BLACKWELL, OF STONE HILL, MISSOURI.

TRANSMISSION GEAR.

Application filed August 27, 1919. Serial No. 320,123.

*To all whom it may concern:*

Be it known that I, ELMER C. BLACKWELL, a citizen of the United States, residing at Stone Hill, in the county of Dent and State of Missouri, have invented certain new and useful Improvements in a Transmission Gear, of which the following is a specification.

This invention relates to transmission gears and more particularly to a mechanism comprising a series of gears arranged so as to form a transmission gearing unit to be employed in connection with an automobile engine whereby the drive shaft may be driven at different speeds controlled by the varying speeds of the engine and speed of the automobile.

One of the primary objects of the invention is to provide an apparatus of this character which will have a series of intermeshing gears always in engagement and which will not require shifting or otherwise moving the gears which constitute the mechanism.

A further object of this invention is the provision of a device of this character which consists of comparatively few parts and is simple in construction but durable and well adapted to withstand the rough usage to which devices of this character are ordinarily subjected.

For a full description of the invention and the advantages and merits thereof, reference is to be had to the following description and accompanying drawings, in which:—

Figure 1 is a plan-view of the mechanism constructed in accordance with my invention, and Figure 2 is a section taken approximately on the line 2—2 of Fig. 1, portions of some of the gears being shown diagrammatically.

Referring to the drawings wherein is illustrated the preferred form of my invention, in which like numerals of reference indicate like or corresponding parts throughout the several views, the engine shaft 1 has keyed at one end a relatively large wheel 11 which is rotatable with the engine shaft. Mounted for rotation on the engine shaft is a sleeve which carries a worm gear 3 and a gear wheel 9. The worm gear 3 is in mesh with a worm 4 which is mounted on one end of an auxiliary shaft 2 which extends at right angles to the engine shaft and carries at its opposite end a beveled gear 5 which meshes with a beveled pinion 6 on a counter shaft 7 the latter being provided at one end with a gear wheel 8.

The driven shaft 15 is in longitudinal alinement with the engine shaft and the gears 12 and 14 are rigidly secured to the shaft 15 to turn the latter.

As shown in Fig. 2 the wheel 11 is provided with a plurality of stud shafts 16 which are arranged near the periphery of the wheel 11 and are circumferentially spaced apart and each stud shaft 16 has its ends projected beyond the opposite sides of the wheel 11 and supports the gears 10 and 13. The gears 10 mesh with the gear wheel 9 and the gears 13 with the gear wheel 12.

It will be seen, therefore, that all of the gears are constantly in mesh and are never shifted or moved out of mesh so that when power is applied to the shaft all of the gears will be actuated and as an example of the method of operation the following description of a possible arrangement of gears is submitted for consideration.

In the construction shown the gears 9 and 10 have equal numbers of teeth while the gears 13 each has the same number of teeth which number is greater than the number of teeth on the gear 12. If the shaft 2 were not driven but the shaft 1 were in motion as shown by the arrow on that shaft then the plate 11 would rotate and carry with it the gears 10, which, owing to their meshing with their gears 9, would rotate as they were carried around said gear 9. Since the gears 13 and gears 10 revolve together this would cause motion of the gears 13 at the same number of revolutions per minute and in the same direction as the gears 10. Since the gears 13 have more teeth than the gear 12 this gear would be turned backward from the direction of revolution of the shaft 1. Depending on the ratio between the gears 13 and 12 the backward revolution would be more or less rapid in proportion to the number of turns of the shaft 1. Now as the gear 12 turns backward the shaft 15 will be revolved in the direction of the arrow on that shaft as will also the gear 14. This will drive the shaft 7 through the gear 8 in the direction of the arrow on that shaft which in like manner will transmit motion to the shaft 2 in the direction of the arrow there shown. Consequently, with the worm arrangement disclosed the sleeve carrying the gear 9 and the worm 4 will be rotated in the same direction as the shaft 1. Now depending on the ratio of the gear train including the gears 14, 8, 6 and 5 the speed of revolution of the shaft 9 will be of a definite ratio to the speed of the shaft 1. In any event this movement of the gear 9 in this manner varies from a slow movement at the start when the worm 3 is driven slowly to a rapid final movement.

The foregoing description and accompanying drawing have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. A transmission gearing mechanism comprising a drive shaft, a driven shaft, a wheel fixed to the drive shaft and provided with circumferentially spaced stud shafts, gears mounted on the extended ends of the stud shaft at one side of the said wheel, smaller gears mounted on the extended end of the stud shafts at the opposite side of the said wheel, gearing mechanism mounted on the said driven shaft and engageable with the larger gears on the said stud shafts, a sleeve provided with gears fixed thereto on the said drive shaft and movable independently of the drive shaft, gearing mechanism connecting the gears on the said driven shaft with the said gears on the said sleeve, one of the said gears on the said sleeve being in mesh with the said smaller gears on the extended ends of the stud shaft.

2. A transmission gearing mechanism comprising a drive shaft and a driven shaft having adjacent ends, a plurality of independently rotatable gears connected in corresponding pairs, arranged in circumferentially spaced apart relation about the adjacent ends of the two shafts and supported radially from the drive shaft to revolve therewith, the gears of each pair uniformly varying in size, a gear disposed centrally of the smaller gears of each pair and supported loosely upon the drive shaft for independent reverse rotation with respect thereto, said center gear corresponding in size to the said smaller circumferential gears and in mesh therewith for accelerating the independent rotation of the smaller gears as each pair revolves with the drive shaft, a gear fixed on the driven shaft and disposed centrally of the larger gears of each pair, and in mesh therewith, said fixed, center gear being of smaller diameter than the larger circumferential gear and rotatable thereby for turning the driven shaft, and a gear mechanism connecting the fixed and loose center gears for the transmission of power from the former to the latter, said mechanism being geared to rotate the loose center gear reversely to the direction of rotation of the driving shaft and at a given gear reduction.

In testimony whereof I affix my signature in presence of two witnesses.

ELMER C. BLACKWELL.

Witnesses:
 E. W. BENNETT,
 H. A. BENNETT.